United States Patent
Sarkkinen et al.

(10) Patent No.: US 6,701,155 B2
(45) Date of Patent: Mar. 2, 2004

(54) NETWORK INITIALIZED PACKET DATA PROTOCOL CONTEXT ACTIVATION FOR MULTICAST/BROADCAST SERVICES

(75) Inventors: Sinikka Sarkkinen, Kangasala (FI); Dimitris Koulakiotis, London (GB); Timo Alakoski, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/108,564

(22) Filed: Mar. 29, 2002

(65) Prior Publication Data

US 2003/0134653 A1 Jul. 17, 2003

Related U.S. Application Data (60) Provisional application No. 60/346,984, filed on Jan. 11, 2002.

(51) Int. Cl.[7] .................................... H04B 7/204
(52) U.S. Cl. ................... 455/515; 455/519; 455/509
(58) Field of Search ................... 455/517, 433, 455/432.1, 435, 466, 560; 370/352, 328, 312, 338, 401

(56) References Cited

U.S. PATENT DOCUMENTS

| | | | |
|---|---|---|---|
| 5,457,680 A | * 10/1995 | Kamm et al. | 455/432.1 X |
| 5,590,133 A | * 12/1996 | Billstrom et al. | 455/433 X |
| 6,501,957 B2 | * 12/2002 | Muhonen et al. | 455/517 X |
| 2003/0043786 A1 | * 3/2003 | Kall et al. | 370/352 |

* cited by examiner

*Primary Examiner*—Nay Maung
*Assistant Examiner*—Philip J. Sobutka
(74) *Attorney, Agent, or Firm*—Antonelli, Terry, Stout & Kraus, LLP (57) ABSTRACT

A method is provided to activate a packet data protocol (PDP) context in a cellular network. This may include determining whether users associated with the cellular network may receive multicast or broadcast data and activating the PDP context based on the determination. The determination may be based on a trigger that occurs when a notification is sent to the Serving GPRS Support Node (SGSN). The SGSN may get notified based on a periodic status query, an update message and/or an activation request, for example.

43 Claims, 6 Drawing Sheets

NETWORK INITIALIZED PACKET DATA PROTOCOL CONTEXT ACTIVATION FOR MULTICAST/BROADCAST SERVICES

This application claims priority under 35 U.S.C. §119(e) from U.S. Provisional Application No. 60/346,984, filed Jan. 11, 2002, the subject matter of which is incorporated herein by reference.

BACKGROUND OF THE INVENTION

1. Field of the Invention

The present invention relates to a method and apparatus for performing multicast/broadcast services.

2. Description of the Related Art

A Multimedia Broadcast/Multicast Service (MBMS) may transfer broadcast and multicast data to multiple users at the same time using shared network resources. This service may save resources in a core network (CN) and a radio access network such as a Universal Terrestrial Radio Access Network (UTRAN) since the same data does not have to be separately sent to each user equipment (UE).

Broadcast services may transmit data to a certain area so that any users in the area may receive the data. In contrast, multicast services may require that the users have subscribed to a multicast service group before receiving the data. The users may possess an encryption key (or similar mechanism) to decipher the received data. The encryption key helps prevent non-subscribed users from receiving the transmission.

The CN may include a network element, such as a MBMS Services Centre (MBMS-SC), that transmits multicast data to serving GPRS Support Nodes (SGSNs) using a multicast Gateway Tunneling Protocol (GTP). The GTP tunnel may be shared with all users under the SGSN. The tunnel may be created only to those SGSNs that have multicast users. When the MBMS-SC/GGSN sends multicast data, it may duplicate the packets and send the packets to all the tunnels. The SGSNs may further create multicast GTP tunnels to radio network controllers (RNCs) that have indicated that they have multicast users in their cells. This sent data may be sent to the RNCs because the data is meant for certain areas and therefore the UEs in this area don't have to indicate their presence to the RNC. The RNC does not know whether there are any UEs in the cell and therefore no indication may be given to the SGSN by the RNC.

The MBMS may transmit many broadcast and multicast services. Each service may have different QoS parameters. Additionally, the multicast services may be transmitted to different groups of users that receive the service. The multicast GTP tunnels between the MBMS-SC and the SGSN and between the SGSN and the RNC may be separately made for each service.

SUMMARY OF THE INVENTION

A method is provided to activate a packet data protocol (PDP) context in a cellular network. This method may include determining whether multicast or broadcast users associated with the cellular network may receive multicast or broadcast data and activating the PDP context based on the determination. The activating may be performed by a Serving GPRS Support Node (SGSN). The activation may be transparent to user equipment. The determination may be based on a trigger. The trigger may occur when a notification is sent to a SGSN. The SGSN may get notified of a status of the multicast or broadcast service based on a periodic status query, an update message or an activation request, for example.

A system is also provided for performing a multicast or broadcast transmission in a cellular network. The system may include a core network node to activate a packet data protocol context based on information of users associated with the cellular network. The core network node may include a SGSN that includes a database related to user information.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and that the invention is not limited thereto.

Embodiments of the present invention may be described with reference to the following drawings in which like reference numerals represents like elements and wherein.

DETAILED DESCRIPTION

Before beginning a detailed description of the subject invention, mention of the following is in order. When appropriate, like reference numerals and characters may be used to designate identical, corresponding or similar components in differing figure drawings. Arrangements and embodiments may be shown in block diagram form in order to avoid obscuring the invention, and also in view of the fact that specifics with respect to implementation of such block diagram arrangements may be highly dependent upon the platform within which the present invention is to be implemented. That is, such specifics should be well within the purview of one skilled in the art. Where specific details are set forth in order to describe example embodiments of the invention, it should be apparent to one skilled in the art that the invention can be practiced without, or with variation of, these specific details.

Figure 1:
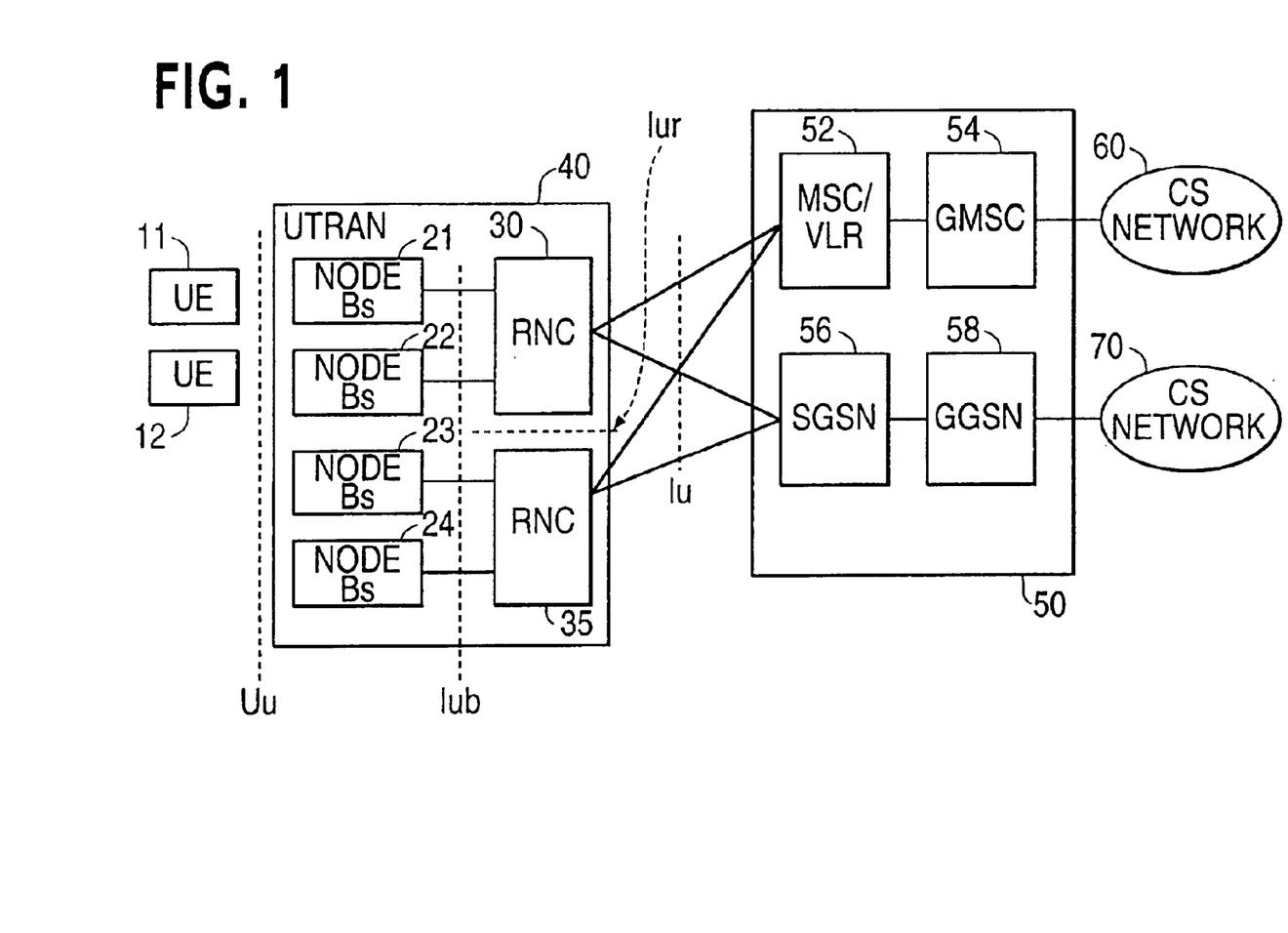
FIG. 1 is a block diagram showing a network architecture.

FIG. 1 is a block diagram of a network architecture according to an example arrangement. Other arrangements are also possible. FIG. 1 shows first user equipment (UE) 11 and second UE 12 connected via a Uu radio interface to respective first and second node Bs 21, 22 of a Universal Terrestrial Radio Access Network (UTRAN) 40. The node Bs 21, 22 may participate in radio resource management and may have the same function as a generic base station. Furthermore, the UTRAN 40 includes at least one Radio Network Controller (RNC) 30 connected to the node Bs 21, 22 via a Iub interface and is responsible for the management and the control of the radio resources in its domain (i.e., the node Bs 21, 22 connected to it). The RNC 30 may be a service access point for all services the UTRAN 40 provides to a core network (CN) 50. FIG. 1 also shows an RNC 35 connected to node Bs 23 and 24 via the Iub interface. An Iur interface is provided between the RNC 30 and the RNC 35. For ease of illustration, the following discussion will relate to the RNC 30 rather than the RNC 35.

The CN 50 may include a Mobile Switching Centre/Visitor Location Register (MSC/VLR) 52, which is a switch (MSC) and database (VLR) that serves an UE in its current location for circuit switched (CS) services. The MSC function may be used to switch the CS transactions, and the VLR function may maintain information regarding the visiting user's service profile, as well as information on the UE's location within the serving system. The part of the network accessed via the MSC/VLR 52 may be referred to as a CS domain. The MSC/VLR 52 may be connected to a Gateway MSC (GMSC) 54, which is a switch at a point where the CN 50 is connected to external CS networks 60 such as Public Switched Telephone Networks (PSTNs), Integrated Services Digital Networks (ISDNs) or Public Land is Mobile Networks (PLMNs). All incoming and outgoing CS connections go through the GMSC 54.

Furthermore, the CN 50 may include a Serving GPRS (General Packet Radio Services) Support Node (SGSN) 56 having a function similar to the MSC/VLR 52 but it may be used for packet switched (PS) services. The part of the network accessed via the SGSN 56 may be referred to as a PS domain. The SGSN 56 may be connected to a Gateway GPRS Support Node (GGSN) 58 having a functionality similar to the GMSC 54 but in relation to the PS services. The GGSN 58 may operate as a switch at the point where the CN 40 is connected to external PS networks 70 such as the Internet.

The MSC/VLR 52 and the SGSN 56 may be connected to the RNC 30 via a Iu-interface, which thus connects the UTRAN 40 to the CN 50. The Iu-interface is an open interface that handles switching, routing and service control.

To achieve multicast transmission between the CN 50 and the UTRAN 40 via the Iu-interface, different characteristics of the multicast related data transmission may be taken into account not only upon active data transmission, but also upon reservation and configuration of the required resources from the Iu-interface. Current 3GPP (3$^{rd}$ Generation Partnership Project) specifications define signalling protocols such as RANAP (Radio Access Network Application Part) and IuUP (Iu Interface User Plane Protocol). The RANAP is a signalling protocol in the Iu-interface that contains all control information specified for the Radio Network Layer used for UTRAN-related issues. The IuUP also belongs to the Radio Network Layer and has been defined to be as much as possible independent of the CN domain that it is used for. The IuUP may carry user data related to Radio Access Bearers (RABs) over the Iu-interface. Each RAB may have its own instance of the protocol. The protocol may perform either a fully transparent operation, or framing for user data segments and some basic control signalling to be used for initialization and online control. Based on these cases, the IuUP may have two modes, i.e., a transparent mode for fully transparent operation and a support mode for predefined SDU (Service Data Unit) sizes corresponding to framed user data segments.

Embodiments of the present invention may provide a method (in a CN) to activate a multicast packet data protocol (PDP) context between the MBMS-SC/GGSN and the RNC. The multicast PDP context activation may include checking whether there are multicast users in the UTRAN, whether the multicast users in the UTRAN are allowed to receive multicast data and creating multicast GTP tunnels. Embodiments of the present invention are also applicable to broadcast data and broadcast service.

Each UE willing to receive a multicast service may have an agreement with a service provider or with an operator of the multicast services. Thus, the UEs that are authorized to receive multicast service are configured to receive multicast data over an air interface before the start of an actual multicast session.

The start of the session may begin from a network (NW). For example, a Gateway GPRS Support Node (GGSN) or a MBMS-SC may define the need for a multicast session in a cellular network. From this network device, the need to start the multicast session may be indicated to the SGSN, which initializes activation of the PDP context. Although activation of the PDP context may be transparently made to the UTRAN and UE, services of the RNC may be needed to indicate the multicast service/group status at the multicast cells. The UTRAN may register if the RNC has multicast users. Embodiments of the present invention may provide that multicast user information is provided to the SGSN, which may start the PDP context activation process without requesting any information from the UTRAN.

Either the RNC or the MBMS-SC may decline the activation request for any number of reasons including, but not limited to, a lack of resources for the service or that there is a lack of subscribers of the service found from that part of the network.

Figure 2:
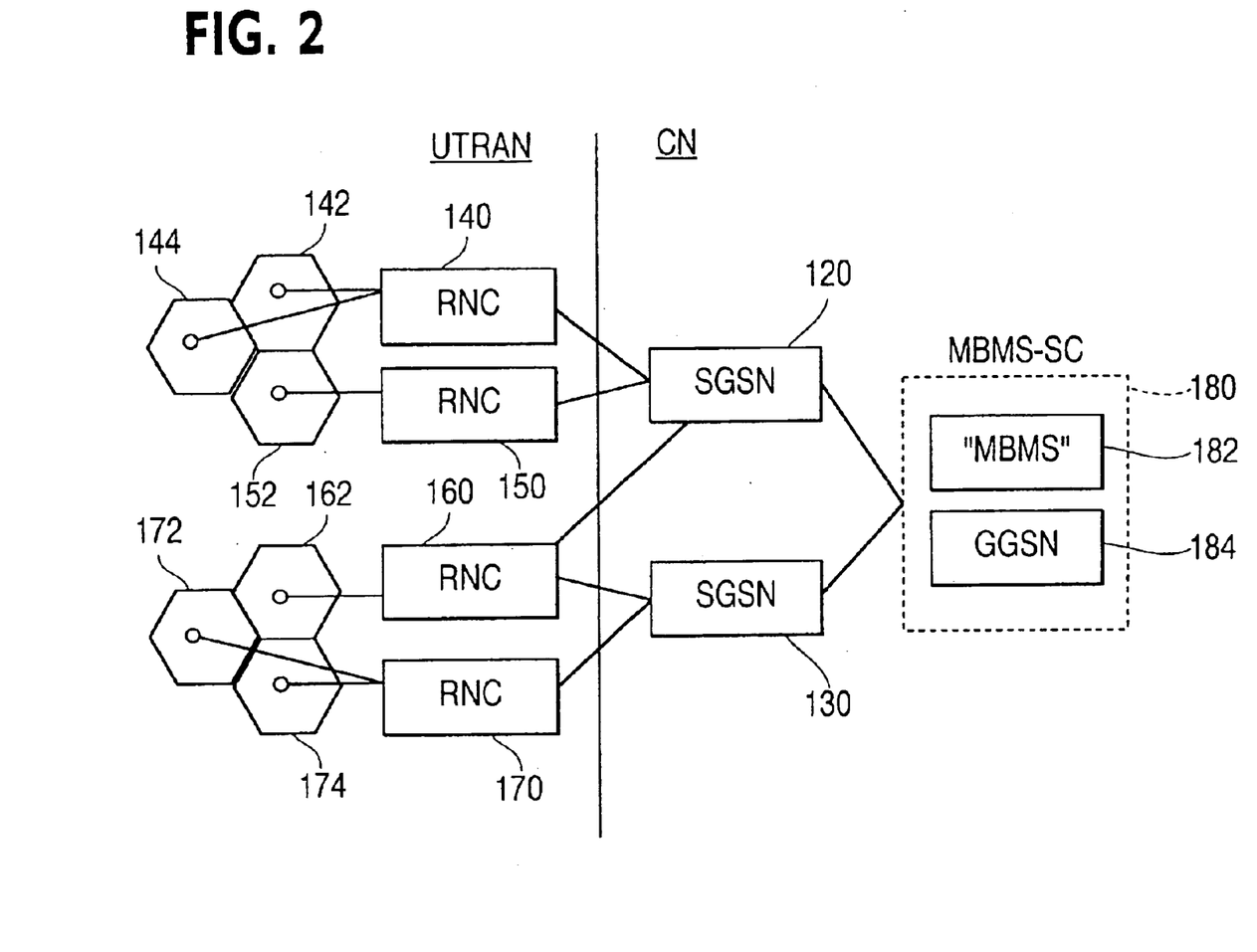
FIG. 2 illustrates a multicast network according to an example embodiment of the present invention.

FIG. 2 illustrates a network having a CN side and a UTRAN side according to an example embodiment of the present invention. Other embodiments and configurations are also within the scope of the present invention. The CN side of the network may have two or more SGSNs such as a SGSN 120 and a SGSN 130. Each SGSN may be associated with one or more RNCs on the UTRAN side of the network. That is, the SGSN 120 may be associated with an RNC 140 and an RNC 150. The SGSN 130 may be associated with an RNC 160 and an RNC 170. In 3GPP rel5, the system may support a configuration in which more than one SGSN may be associated with each RNC. FIG. 2 shows an example in which the SGSN 120 is also associated with the RNC 160.

Each RNC may have one or more multicast areas that include one or a plurality of cells. For example, the RNC 140 may have a multicast area 142 and a multicast area 144, and the RNC 150 may have multicast area 152. The RNC 160 may have a multicast area 162 and the RNC 170 may have a multicast area 172 and a multicast area 174.

The SGSNs 120 and 130 may be coupled to a GGSN 184. A MBMS-SC 180 may hereafter be referred to as a functional combination of the GGSN 184 and a MBMS 182. The MBMS 182 and the GGSN 184 may also be separate network devices. The MBMS-SC 180 is the network element that sends multicast and broadcast packets to UEs.

The broadcast and multicast geographic areas defined by the UTRAN will now be described. The broadcast and multicast services may be restricted to certain geographical areas. For example, a football results video stream service may be transmitted only to cells (or multicast areas) that cover a particular stadium having a particular football game.

Along with a UE based multicast database, every RNC may include a table (or database) containing information indicating which multicast service is allowed to be transmitted to which multicast areas.

The MBMS-SC 180 does not have to have knowledge of which SGSNs are allowed to receive the multicast service. Additionally, the SGSNs (such as the SGSN 120 and the SGSN 130) do not have to have knowledge of which RNCs are allowed to receive the multicast service.

Information stored in a database of each SGSN will now be described. In order to allow each SGSN to work more efficiently, the SGSN may maintain a database including, but not limited to, information of the following:

1. Multicast groups indicated by different RNCs;
2. Multicast services indicated by different RNCs;
3. Authorized UEs indicated by different RNCs; and
4. Any combination of the above.

If the multicast database in the SGSN is organized based on multicast group identifiers, then the SGSN may know what kind of multicast groups can be found under each RNC and therefore the SGSN may route the received multicast data packets to the correct RNCs.

If the multicast database in the SGSN is organized based on multicast service identifiers, then the SGSN may route the received multicast data based on the multicast service identifiers.

If the multicast database in the SGSN is organized based on information about authorized UEs, then the SGSN may route the received multicast data based on UE information. The location information of the UEs can be, for example, any of the following:

1. Cell level information (i.e., the RNC sends an indication to the SGSN each time the UE enters into a new cell);
2. Multicast area level information (especially if the area controlled by one RNC includes multiple multicast areas); and
3. RNC level information One example of a combination of the previous identifiers may be service/group information. In this case, the SGSN may not be aware of actual UEs in the cells, but the SGSN may be aware of multicast groups and the services that have subscribers under each RNCs.

Information in the database may be used before actual multicast data transmission and upon active data transmission in order to route multicast data also into such cells in which no multicast data has previously been sent due to lack of authorized UEs in the cell.

Figure 3:
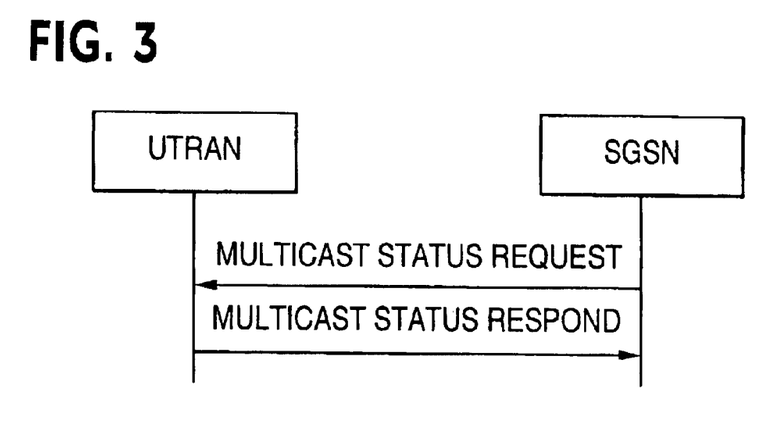
FIG. 3 illustrates an SGSN sending a status request according to an example embodiment of the present invention.
Figure 4:
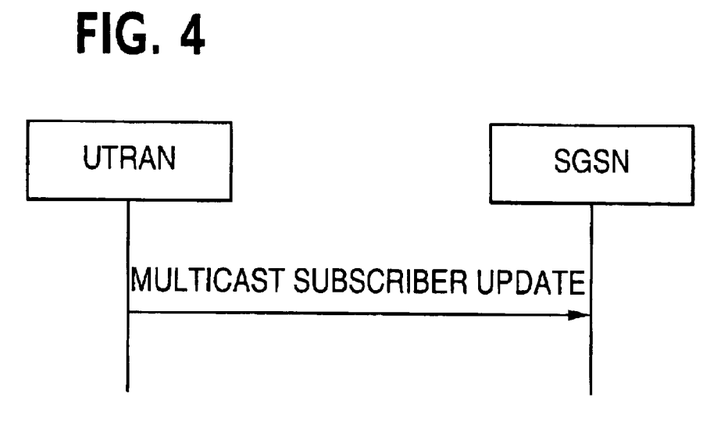
FIG. 4 illustrates a UTRAN sending an update message to the SGSN according to an example embodiment of the present invention.
Figure 5:
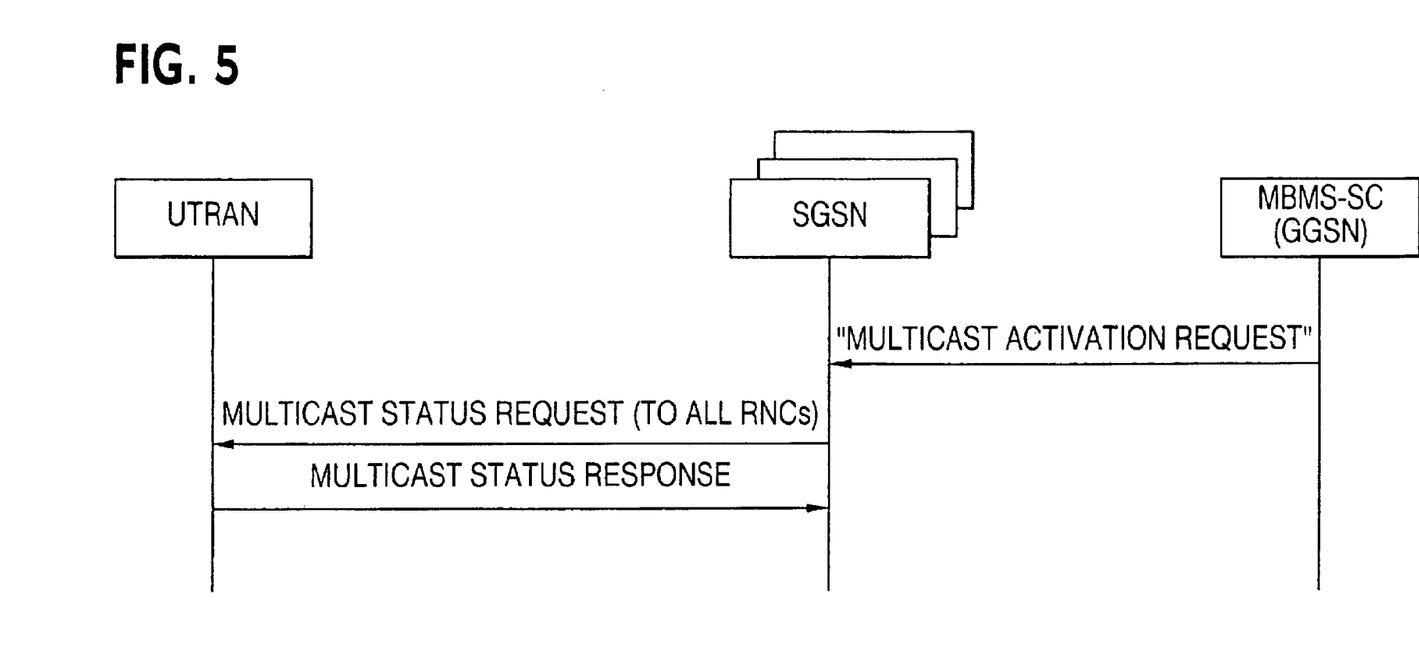
FIG. 5 illustrates a MBMS-SC requesting a multicast status request according to an example embodiment of the present invention.

Updating of information within the database of the SGSN will now be described. A multicast trigger may occur when a notification is sent to a SGSN. The SGSN may get notified based on a periodic status query, based on an update message, and/or based on an activation request, for example. FIGS. 3–5 will each be described to show how the SGSN may get the required information from the RNC in order to make the decision whether it will initialize the PDP context activation or not. These figures generally show updating of the database within the SGSN.

FIG. 3 shows an example of the SGSN (such as the SGSN 120 shown in FIG. 2) sending a periodic status query according to an example embodiment of the present invention. Other embodiments are also within the scope of the present invention. The SGSN 120 may send a multicast status query periodically to all of its RNCs (such as the RNC 140 and the RNC 150 shown in FIG. 2). The operator may decide the time between each of the queries. The respective RNCs (on the UTRAN side) may provide a multicast status response. The status response may include information, for example, of the multicast service identities, multicast group identities, the multicast UE identities, the number of UEs in each service and/or the multicast groups (or any combination thereof). Based on this information, the SGSN is aware of the type of multicast services/groups the RNC is ready to serve and based on the number of UEs under each multicast service/group, the SGSN may determine whether the multicast service may be more efficiently sent by a point-to-point connection or by a point-to-multipoint connection.

After receiving information from the RNC, the SGSN may determine (from the multicast table) if any changes have occurred. These changes may include multicast UEs moving to a new multicast area or new services/group ids are indicated by the RNC. That is, the SGSN may get notified of a new address or of a new identification of the multicast service. The SGSN may act accordingly by updating the database based on the indicated situation in the RNC.

FIG. 4 illustrates an example of the UTRAN sending an update message to the SGSN according to an example embodiment of the present invention. Other embodiments are also within the scope of the present invention. The RNC (such as the RNC 140) may send an update message to the SGSN (such as the SGSN 120) when the RNC notices a change in the multicast information indicated from the UEs. The RNC may also send this information periodically. This change may be, for example, a new multicast UE in its multicast area cells. The update message may include information of new multicast service/multicast groups, information about multicast UE identity, and/or a number of new UEs for each multicast service/group. Other information may also be communicated. After receiving the update message, the SGSN may update the multicast related database.

FIG. 5 illustrates an example of the MBMS-SC requesting the SGSN to start a query according to an example embodiment of the present invention. Other embodiments are also within the scope of the present invention. The MBMS-SC (such as the MBMS-SC 180) may desire to start the multicast data transmission for a multicast service. If a multicast PDP context activation does not exist, the MBMS-SC may send a notification, which may hereafter be called a "Multicast Activation Request" (i.e., Multicast service id/group id) to all the SGSNs or to a select number of the SGSNs that the operator has selected to transmit multicast data. The target SGSNs may be defined also from the result of the address mapping, which can be done in the GGSN if the GGSN and the MBMS are different network devices. That is, the MBMS defines the logical area (e.g. New York City) and the GGSN defines which SGSN offers services to the New York City area. The SGSN(s) receiving the Multicast Activation Request may then send a status request to the RNCs as discussed above.

One benefit of sending the Multicast Activation Request to all the SGSNs is that the MBMS-SC does not have to maintain a table to determine which SGSNs belong to which multicast area. The operator may then dynamically modify the area in which the multicast service is allowed to receive.

Figure 6:
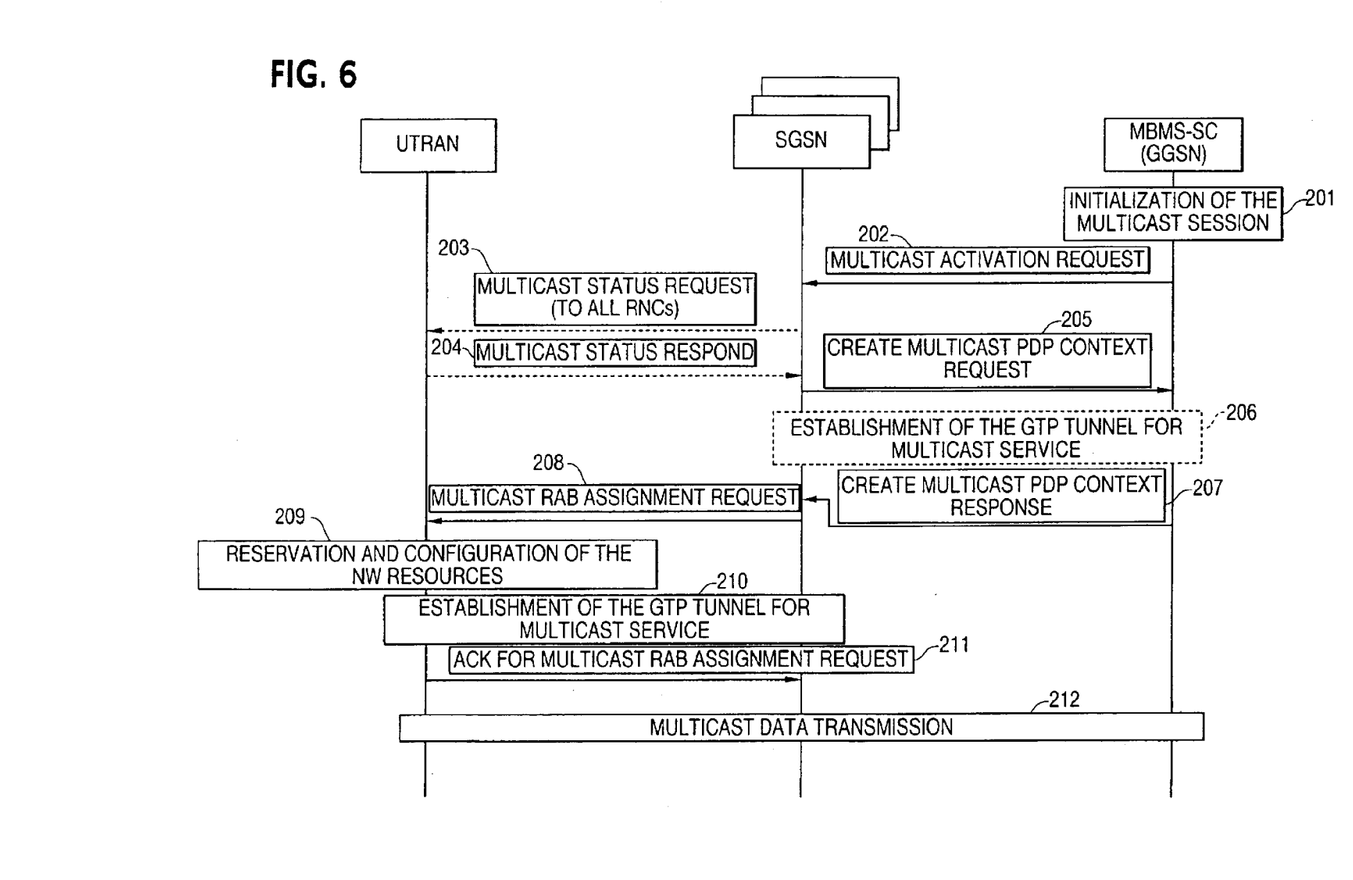
FIG. 6 illustrates a multicast PDP context activation according to an example embodiment of the present invention.

FIG. 6 illustrates a method of multicast PDP context activation from the SGSN according to an example embodiment of the present invention. Other methods, embodiments and orders of operation are also within the scope of the present invention. As shown in block 201, a multicast session may be initialized in the MBMS-SC (or in the GGSN) that receives multicast session related data packets from the external network.

If the MBMS-SC is allowed to handshake with the SGSN, the MBMS-SC may send (in block 202) a "Multicast Activation Request" to all the SGSNs in a network (or a group of SGSNs that are known, for example, to locate a specific area). In the "Multicast Activation Request" message, the MBMS-SC may indicate (to the SGSN) the requested multicast service/group identity or an address of the service that is in the RNC known to be a multicast service address.

On the other hand, the GGSN may initialize the multicast session either by sending the "Multicast Activation Request" or a "PDU Notification request" message in which the GGSN indicates the reception of the multicast data packets from the external network In block 203, the SGSNs may send a Multicast Status Request to all the RNCs or only to a group of the RNCs that have not previously indicated any information regarding the multicast service in question (i.e., no UEs have indicated an interest to receive the multicast session under process).

In block 204, the UTRAN (i.e., the RNCs) may respond to the SGSN by sending a Multicast Status Response based on a current status of the multicast database, The response may contain information about the number of UEs in each cell that have indicated an interest to receive the multicast session.

In blocks 205–207, based on information received from the RNCs and the GGSN/MBMS-SC and information in the databases of the SGSN, the SGSN may send a Create Multicast PDP Context Request (i.e., Multicast service id, Multicast area id, TEID, . . . ) to the GGSN or to the MBMS-SC. The order of sending the Multicast Status Report inquiry and the Create Multicast PDP Context Request may vary. The SGSN may also send the Create Multicast PDP Context Request prior to or at the same time as the Multicast Status Report inquiry. Alternatively, if the SGSN has enough information from the RNC based on previous inquiries, the SGSN may skip the operations of blocks 203 and 204.

Upon creation of the PDP context between the GGSN/ MBMS-SC and the SGSN, the system may establish GTP tunnels for the actual user plane data (i.e., multicast data packets) in block 206.

If the establishment of the PDP context is successful from the GGSN/MBMS-SC point of view, the GGSN I MBMS-SC may send the Create Multicast PDP Context Response to the SGSN in block 207. If the PDP context can not be established between the GGSN/MBMS-SC and the SGSN, then a negative acknowledgement message may be sent to the SGSN in which case initialization of the multicast service session may terminate.

As shown in blocks 208–211, after receiving a response from the GGSN/MBMS-SC the SGSN may start the RAB assignment process by sending a Multicast RAB assignment request to the RNC. On the other hand, if the number of authorized UEs is very low, then a normal RAB assignment request may be sent in order to establish point-to-point connection between the SGSN and the UE. The RNC may check the radio resource situation on the air interface and reserve resources from the UTRAN and the air interface. The lu interface may be configured to support user plane multicast data transmission over the lu interface.

If all the required configurations and the resource reservations are successful, then the RNC may send a positive acknowledgement to the SGSN. However, if, for example, no resources are available for the multicast services, then the RNC may send a negative acknowledgment to the SGSN to terminate the multicast activation procedure in the SGSN.

In block 212, after receiving the positive acknowledgement from the RNC, the SGSN may start forwarding data to the RNC.

Figure 7:
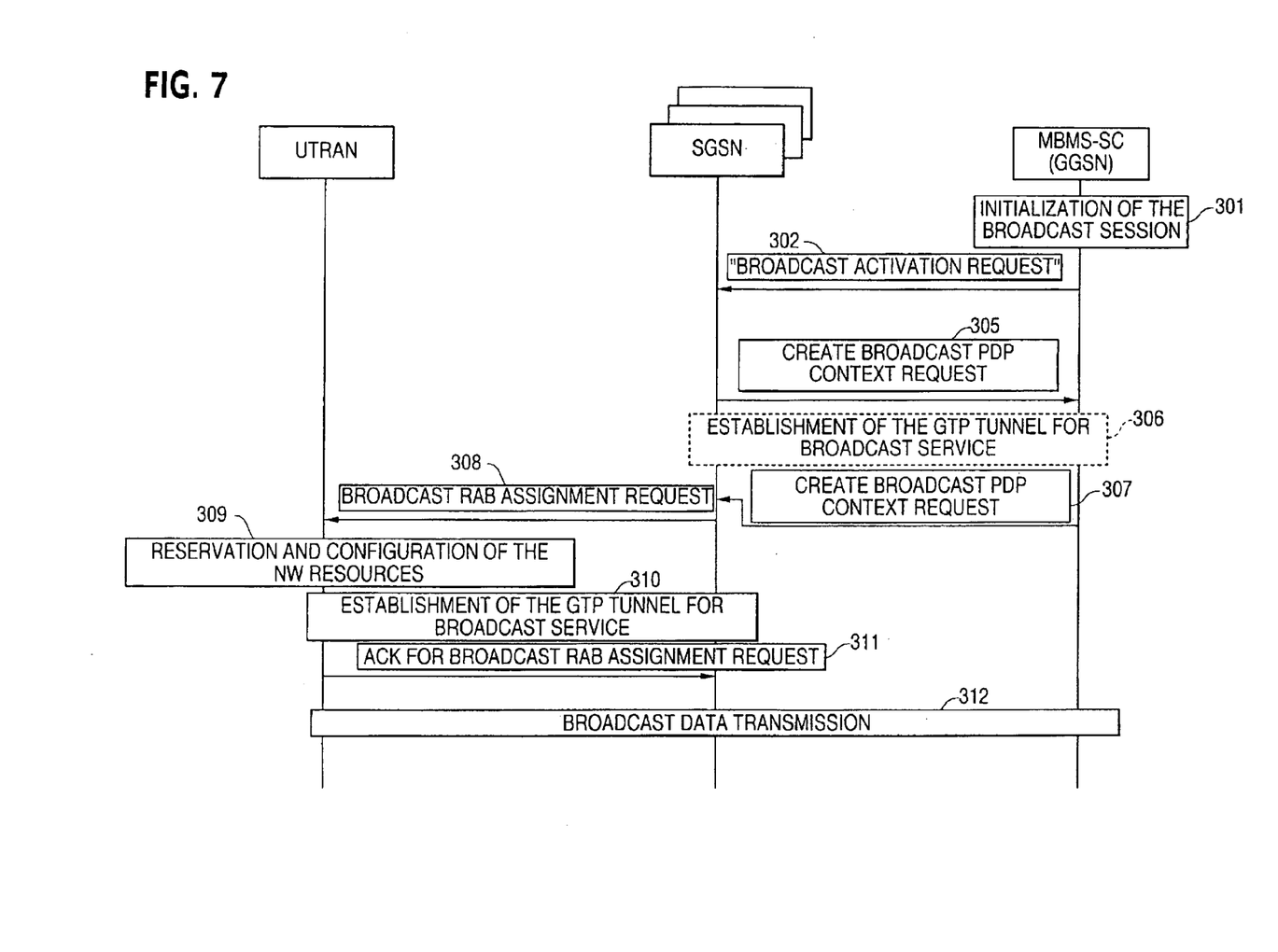
FIG. 7 illustrates a broadcast PDP context activation according to an example embodiment of the present invention.

FIG. 7 illustrates a method of broadcast PDP context activation from the SGSN according to an example embodiment of the present invention. Other methods, embodiments and orders of operation are also within the scope of the present invention. The phases of creation of the PDP context for the broadcast services may be similar to the multicast case. One difference between multicast service and broadcast services is that the SGSN does not have to ask any status information from the RNC. The decision of which area the broadcast data is meant to send may be determined in the SGSN. This information may be indicated in the "Broadcast RAB assignment request" shown in block 312. For broadcast service, a point-to-point connection may not be established between the UEs and the network.

More specifically, FIG. 7 shows that in block 301, a broadcast session may be initialized in the MBMS-SC (or in the GGSN) that receives broadcast session related data packets from the external network. The MBMS-SC may send (in block 302) a "Broadcast Activation Request" message to all the SGSNs in a network (or a group of SGSNS). In block 305, the SGSN may send a Create Broadcast PDP Context Request to the MBMS-SC (or the GGSN). Upon creation of the PDP context between the GGSN/MBMS-SC and the SGSN, the system may establish GTP tunnels for the Broadcast service in block 306. If the establishment of the PDP context is successful from the GGSN/MBMS-SC point of view, the GGSN/MBMS-SC may send the Create Broadcast PDP Context Response to the SGSN in block 307. If the PDP context can not be established between the GGSN/ MBMS-SC and the SGSN, then a negative acknowledgement message may be sent to the SGSN in which case initialization of the broadcast service session may terminate. As shown in blocks 308–311, after receiving a response from the GGSN/MBMS-SC, the SGSN may start the RAB assignment process by sending a Broadcast RAB assignment request to the RNC. The RNC may check the radio resource situation on the air interface and reserve resources from the UTRAN and the air interface. The lu interface may be configured to support user plane multicast data transmission over the lu interface. If all the required configurations and the resource reservations are successful, then the RNC may send a positive acknowledgement to the SGSN. However, if, for example, no resources are available for the broadcast services, then the RNC may send a negative acknowledgment to the SGSN to terminate the broadcast activation procedure in the SGSN. In block 312, after receiving the positive acknowledgement from the RNC, the SGSN may start forwarding data to the RNC.

Point-to-point connection and point-to-multipoint connection will now be described. Based on the multicast database in the SGSN, the SGSN may route multicast sessions to the proper RNCs having UEs that are able to receive certain multicast services or that are members of certain multicast groups. In this way, the use of multicast related radio resources on the UTRAN side may be optimized when the data is sent only via the radio interfaces under which the potential listeners are known to exist.

To make the system more efficient from the air interface point of view, the SGSN may define whether it requests (for the "multicast RAB") either the point-to-point connection or the point-to-multipoint connection. The point-to-point connection may be efficient when the number of service users in a cell is very high. The point-to-point connection may be considered when the number of specific multicast service subscribers is very low (i.e., only a few subscribers per cell). In order to make this evaluation in the SGSN, the SGSN should be aware of the number or different service subscribers or multicast groups members in a cell. The SGSN may obtain this information from the RNC to maintain the database based on information received from the UEs in a cell or when the point-to-point connection is appropriate for the multicast data transmission based on a low number of authorized UEs in a cell. Identification of the UEs may be obtained from the cells by paging the UEs using enhanced paging procedures in which the paging response contains the UE identification based on which point-to-point connection may be established. More specifically, the page is sent to the UEs by using identification (e.g., multicast IMSI) that identifies the service or a multicast group but not the subscriber or the UE itself. As a response, the UE may send back actual UE identification on which the network may establish the required point-to-point connection.

The UE amount information may be obtained from the RNC either by using the periodic status request procedure, the UTRAN initiated information update procedure or triggering based status inquiry. After receiving the information, the SGSN may determine whether the indicated service subscriber number for the new service is so low that rather than using the point-to-multipoint connection, the multicast service may be sent using specific point-to-point connections. When the point-to-point connection is selected, rather than requesting "multicast RAB" from the RNC, the SGSN may start the normal RAB assignment procedure to initialize the reservation of the dedicated resources for each multicast service authorized UEs in a cell. In the UTRAN, initialization of the point-to-point connection does not differ from procedures defined for the NRT/RT packet data services in 3GPP.

Embodiments of the present invention may provide a method (in a CN) to activate a multicast or broadcast PDP context between a MBMS-SC/GGSN and a RNC. Multicast or broadcast PDP context activation may include checking whether there are users in the UTRAN, whether the users are allowed to receive the multicast or broadcast data, and creating a GTP tunnel. UEs authorized to receive the service may be configured to receive the data over an air interface before the actual session starts.

The start of the session may begin from the network (NW). The first network element that defines the need for the multicast or broadcast session in the cellular network may be either the GGSN or the MBMS-SC. From this device, the need to start the multicast or broadcast session may be indicated to the SGSN which further is responsible for initializing activation of the PDP context. Although the activation of the PDP context is transparently made to the UTRAN and UE, the services of the RNC may indicate the service/group status at the cells. The UTRAN may register if the RNC has multicast or broadcast users to the CN.

Embodiments of the present invention may provide that user information comes to the SGSN, which can use this information to start the PDP context activation process. The RNC or the MBMS-SC may decline an activation request for reasons such as the lack of resources for the service or the lack of subscribers of the service has been found from that part of the network.

Embodiments of the present invention may thereby share network resources thus saving capacity. Additionally, no multicast data may be sent to the RNC under which on unauthorized UE are provided. Resource reservation on both the CN and the UTRAN may additionally be a transparent transaction to UEs.

Any reference in this specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A method to activate a packet data protocol (PDP) context in a cellular network comprising:

transmitting, from a radio network controller, status information of users, said status information indicating whether users associated with said cellular network may receive one of multicast data and broadcast data; and activating said PDP context based on said transmitted status information.

2. The method of claim 1, wherein said activating said PDP context is performed by a Serving GPRS Support Node (SGSN).

3. The method of claim 2, further comprising maintaining a database on said SGSN related to user information.

4. The method of claim 3, further comprising updating said database on said SGSN.

5. The method of claim 1, wherein said activating said PDP context is performed by said network.

6. The method of claim 1, wherein said activation is transparent to user equipment.

7. The method of claim 1, wherein said activating said PDP context comprises utilizing the Radio Network Controller (RNC) to indicate a status of user cells.

8. The method of claim 1, wherein said transmitting is based on a trigger, wherein said trigger occurs when a notification is sent to a Serving GPRS Support Node (SGSN).

9. The method of claim 8, wherein said SGSN gets notified of a status of one of multicast service and broadcast service based on a periodic status query.

10. The method of claim 8, wherein said SGSN gets notified of a status of one of multicast service and broadcast service based on an update message.

11. The method of claim 8, wherein said SGSN gets notified of a status of one of multicast service and broadcast service based on an activation request.

12. The method of claim 8, wherein said SGSN gets notified of a new address for one of multicast service and broadcast service.

13. The method of claim 8, wherein said SGSN gets notified of a new identification of one of multicast service and broadcast service.

14. The method of claim 1, further comprising creating Gateway Tunneling Protocol tunnels following said activation.

15. A method comprising activating a packet data protocol (PDP) context in a cellular network by transmitting, from a radio network controller, status information of users, said status information indicating whether users may receive one of multicast data and broadcast data.

16. The method of claim 15, wherein said activating said PDP context is performed by a Serving GPRS Support Node (SGSN).

17. The method of claim 16, further comprising maintaining a database on said SGSN relating to user information.

18. The method of claim 17, further comprising updating said database on said SGSN.

19. The method of claim 15, wherein said activating said PDP context is performed by said network.

20. The method of claim 15, wherein said activation is transparent to user equipment.

21. The method of claim 15, wherein said transmitting is based on a trigger, wherein said trigger occurs when a notification is sent to a Serving GPRS Support Node (SGSN).

22. The method of claim 21, wherein said SGSN gets notified of a status of one of multicast service and broadcast service based on a periodic status query.

23. The method of claim 21, wherein said SGSN gets notified of a status of one of multicast service and broadcast service based on an update message.

24. The method of claim 21, wherein said SGSN gets notified of a status of one of multicast service and broadcast service based on an activation request.

25. The method of claim 21, wherein said SGSN gets notified of a new address for one of multicast service and broadcast service.

26. The method of claim 21, wherein said SGSN gets notified of a new identification of one of multicast service and broadcast service.

27. The method of claim 15, further comprising creating Gateway Tunneling Protocol tunnels following said activation.

28. A system for performing a transmission in a cellular network, said system comprising a core network to receive, from a radio network controller, status information indicating whether users associated with said cellular network may receive one of multicast data and broadcast data, said core network to activate a packet data protocol context with users associated with said cellular network based on the transmitted status information.

29. The system of claim 28, wherein said core network comprises a node to maintain a database related to user information.

30. The system of claim 29, wherein said core network comprises a Serving GPRS Support Node (SGSN).

31. The system of claim 30, wherein said activation is based on a trigger, wherein said trigger occurs when a notification is sent to said SGSN.

32. The system of claim 31, wherein said SGSN gets notified of a status of one of multicast service and broadcast service based on a periodic status query.

33. The system of claim 31, wherein said SGSN gets notified of a status of one of multicast service and broadcast service based on an update message.

34. The system of claim 31, wherein said SGSN gets notified of a status of one of multicast service and broadcast service based on an activation request.

35. The system of claim 31, wherein said SGSN gets notified of a new address for one of multicast service and broadcast service.

36. The system of claim 31, wherein said SGSN gets notified of a new identification of one of multicast service and broadcast service.

37. The system of claim 28, wherein said core network node activates said packet data protocol by determining whether there are users in a radio access network and determining whether said users are allowed to receive one of multicast data and broadcast data.

38. The system of claim 28, wherein said core network transmits data using a point-to-point connection based on a number of user equipment being below a predetermined number.

39. The system of claim 38, wherein said number of user equipment is obtained by paging user equipment using identification that identifies a service.

40. The system of claim 39, wherein said number of user equipment is further obtained by said user equipment sending user equipment identification as a response.

41. A method to activate a packet data protocol (PDP) context in a cellular network comprising:
    determining whether users associated with said cellular network may receive one of multicast data and broadcast data; and
    activating said POP context based on said determination,
    wherein said determining is based on a trigger, said trigger occurring when a notification is sent to a serving GPRS support node (SGSN), and said SGSN gets notified of a status of one of multicast service and broadcast service based on one of a periodic status query and an update message.

42. A system for performing a transmission in a cellular network, said system comprising a core network to activate a packet data protocol context with users associated with said cellular network, said core network including a serving GPRS support node (SGSN), and said SGSN gets notified of a status of one of multicast service and broadcast service based on one of a periodic status query and an update message.

43. A system for performing a transmission in a cellular network, said system comprising a core network to activate a packet data protocol context with users associated with said cellular network, wherein said core network transmits data using a point-to-point connection based on a number of user equipment being below a predetermined number, said number of user equipment being obtained by paging user equipment using identification that identifies a service.

* * * * *